(12) United States Patent
Shiba et al.

(10) Patent No.: US 8,479,599 B2
(45) Date of Patent: Jul. 9, 2013

(54) STARTER FOR INTERNAL COMBUSTION ENGINE

(75) Inventors: Toshimitsu Shiba, Toyota (JP); Toshiaki Asada, Mishima (JP); Makoto Ishikawa, Nishikamo-gun (JP); Tomoaki Suzuki, Nagoya (JP); Kazuhito Sakai, Makinohara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 766 days.

(21) Appl. No.: 12/226,326

(22) PCT Filed: Apr. 19, 2007

(86) PCT No.: PCT/IB2007/002077
§ 371 (c)(1),
(2), (4) Date: Oct. 15, 2008

(87) PCT Pub. No.: WO2007/141652
PCT Pub. Date: Dec. 13, 2007

(65) Prior Publication Data
US 2009/0165593 A1    Jul. 2, 2009

(30) Foreign Application Priority Data
Apr. 21, 2006    (JP) .................................. 2006-118297

(51) Int. Cl.
*F02N 15/06*    (2006.01)
(52) U.S. Cl.
USPC ............................................................ 74/6
(58) Field of Classification Search
USPC ...... 74/6, 7 A, 7 B, 7 C, 7 R; 411/72; 29/505, 29/521; 277/608
See application file for complete search history.

(56) References Cited

U.S. PATENT DOCUMENTS

| 7,472,672 B2 * | 1/2009 | Asada et al. ............. 123/179.25 |
| 2003/0011143 A1 * | 1/2003 | Shinoda et al. ................ 277/614 |
| 2003/0039527 A1 * | 2/2003 | Schatz .............................. 411/9 |
| 2004/0255890 A1 * | 12/2004 | Tsutsumi et al. ........ 123/179.24 |

FOREIGN PATENT DOCUMENTS

| DE | 195 46 708 A1 | 6/1997 |
| EP | 1 288 021 A2 | 3/2003 |
| EP | 1 748 181 A2 | 1/2007 |
| JP | A-2004-169668 | 6/2004 |
| JP | A-2005-61388 | 3/2005 |
| WO | WO 2007/012946 A1 | 2/2007 |

* cited by examiner

*Primary Examiner* — Justin Krause
*Assistant Examiner* — Keith Minter
(74) *Attorney, Agent, or Firm* — Oliff & Berridge, PLC (57) ABSTRACT

A starter for an internal combustion engine includes a power transmission mechanism. The power transmission mechanism has an outer race plate fastened to a crankshaft, and a ring gear coupled to a rotational shaft of an electric motor for starting the engine. The power transmission mechanism further has a one-way clutch for permitting torque transmission only from the ring gear to the outer race plate, and two sealing members. Lubricant is supplied from the cylinder block to the interior of the power transmission mechanism for lubricating the power transmission mechanism. The outer race plate has a groove on its contact surface of a contact portion between the crankshaft and the outer race plate. The groove extends in the entire circumferential direction of the crankshaft. This maintains the coupling strength between the outer race plate and the crankshaft, while enhancing the sealing performance of the power transmission mechanism.

13 Claims, 5 Drawing Sheets

BEFORE FASTENING

FIG. 4B

AFTER FASTENING

STARTER FOR INTERNAL COMBUSTION ENGINE

BACKGROUND OF THE INVENTION

1. Field of the Invention

The present invention relates to a starter for an internal combustion engine having an electric motor that is driven to compulsory rotate an output shaft of the engine and start the engine.

2. Description of the Related Art

Generally, a starter for a vehicle internal combustion engine has a power transmission mechanism for transmitting the driving force of the electric starter motor to the engine output shaft such as a crankshaft. A typical structure of such power transmission mechanism is described as follows (See JP-A-2004-169668).

The power transmission mechanism includes an engine-side power transmission member, an electric-motor-side power transmission member, and a one-way clutch. The engine-side power transmission member is fastened to the engine output shaft with bolts and rotates with the engine output shaft. The electric-motor-side power transmission member is provided rotatably relative to the engine output shaft, while being coupled to a rotational shaft of the electric motor. The one-way clutch is located between the engine-side power transmission member and the electric-motor-side power transmission member. The one-way clutch permits torque transmission only in one direction between these members, that is, the direction from the electric-motor-side power transmission member to the engine-side power transmission member (more specifically, from the electric motor to the engine output shaft).

In the starter for an internal combustion engine having such power transmission mechanism, when the electric motor is driven on request for engine start-up, the one-way clutch is brought into engagement to transmit torque from the electric motor to the engine output shaft. When combustion is completed in the internal combustion engine, in other words, when the internal combustion engine starts rotating autonomously without the aid of the electric motor, the one-way clutch is released. This results in disconnection between the engine output shaft and the electric motor.

In the starter, the interior of the power transmission mechanism is partitioned by the engine output shaft, the engine-side power transmission member and the electric-motor-side power transmission member. Lubricant is supplied from an engine body to the interior of the power transmission mechanism for lubricating the power transmission mechanism. A sealing member is provided respectively between the engine-side power transmission member and the electric-motor-side power transmission member, and between the engine body and the electric-motor-side power transmission member. The sealing member prevents lubricant from leaking out of the interior of the power transmission mechanism.

In contrast, no specific sealing treatment for preventing lubricant leakage is applied to a certain portion of the aforementioned power transmission mechanism, where the engine-side power transmission member is mounted to the engine output shaft. However, in the structure of the power transmission mechanism, the engine-side power transmission member is fastened to the engine output shaft, and the pressure between their contact surfaces is thus increased. Therefore, this structure hardly allows lubricant to leak from the mounted portion of the engine-side power transmission mechanism, that is, between the engine output shaft and the engine-side power transmission member. Nonetheless, additional sealing treatment may be applied between the engine output shaft and the engine-side power transmission member for more reliably sealing the lubricant within the interior of the power transmission mechanism.

Such additional sealing treatment provided for the foregoing mounted portion can be a sealing member, such as a gasket and an O-ring. This enhances sealing performance of the mounted portion, and accordingly, sealing performance of the power transmission mechanism.

However, the engine-side power transmission member is designed to transmit torque to the engine output shaft large enough to compulsory rotate the shaft at engine start-up. Thus, the engine-side power transmission member needs to be coupled tightly to the engine output shaft in order to maintain high reliability of the power transmission mechanism. Therefore, applying the aforementioned sealing treatment causes the sealing member to excessively deform as the engine-side power transmission member is fastened to the engine output shaft. This does not ensure sealing performance high enough for the mounted portion of the engine-side power transmission mechanism. Thus, to obtain the sufficient sealing performance, the engine-side power transmission member should be fastened to the engine output shaft with a smaller force. As a result, a higher coupling strength between the engine output shaft and the engine-side power transmission member is traded off for higher sealing performance.

SUMMARY OF THE INVENTION

The present invention provides a starter for an internal combustion engine, which maintains a high coupling strength between the engine-side power transmission member and the engine output shaft, while enhancing the sealing performance of the power transmission mechanism.

One aspect of the invention is directed to a starter for an internal combustion engine including a power transmission mechanism having: an engine-side power transmission member fastened to an engine output shaft; an electric-motor-side power transmission member provided rotatably relative to the engine output shaft and coupled to a rotational shaft of an electric motor for starting the engine; a one-way clutch provided between the engine-side power transmission member and the electric-motor-side power transmission member to permit torque transmission in a direction from the electric-motor-side power transmission member to the engine-side power transmission member; and a sealing member respectively provided between the engine-side power transmission member and the electric-motor-side power transmission member, and between the engine body and the electric-motor-side power transmission member, in which lubricant is supplied from the engine body to the interior of the power transmission mechanism for lubricating the power transmission mechanism. A partially recessed portion is provided in the circumferential direction of the engine output shaft on at least one of contact surfaces of the engine output shaft and the engine-side power transmission member in a contact portion between the engine output shaft and the engine-side power transmission member.

According to the aspect, the overall contact surface area between the engine output shaft and the engine-side power transmission member is smaller relative to the case without the recessed portion, and accordingly, the pressure applied to the contact surface is higher. This enhances the sealing performance of the contact portion between the engine output shaft and the engine-side power transmission member, and therefore, enhances the sealing performance of the power transmission mechanism. Moreover, the engine-side power transmission member is fastened to the engine output shaft with no sealing member interposed between these components. This structure helps maintain the coupling strength between the engine-side power transmission member and the engine output shaft at a high level.

In place of the aforementioned recessed portion, a recess may be formed in a geometric pattern, or may be a maze-like groove. Other than that, a groove may extend about an axis of the engine output shaft in a spiral pattern.

The groove extending in a spiral pattern may be a single groove extending in a fashion similar to a record groove. This allows the groove to be easily formed by the cutting process.

The aforementioned recessed portion may be formed into plural grooves extending about an axis of the engine output shaft. The plural grooves may be coaxial grooves. This allows the grooves to be easily formed by the cutting process.

The aforementioned groove may extend such that the contact surface has a sawtoothed shape in section, taken along the direction perpendicular to the engine output shaft.

According to this construction, when the engine-side power transmission member is fastened to the engine output shaft, protruding edges of the contact surface having a groove are subjected to plastic deformation, thereby increasing a degree of tight contact between the respective contact surfaces in the contact portion between the engine output shaft and the engine-side power transmission member. Thus, the sealing performance improves at the aforementioned contact portion. Accordingly, the sealing performance of the power transmission mechanism improves to a desired level.

The groove may be formed across the entire contact surface. According to this construction, prior to when the engine-side power transmission member is fastened to the engine output shaft, no plane contact exists between the engine output shaft and the engine-side power transmission member. Therefore, when the engine-side power transmission member is fastened to the engine output shaft, a relatively lower surface pressure suffices to achieve plastic deformation of the protruding edges of the contact surface having the groove, compared to the construction, in which a groove is formed only on a part of the contact surface. This increases the degree of tight contact between the respective contact surfaces to a desired level.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

Figure 1:
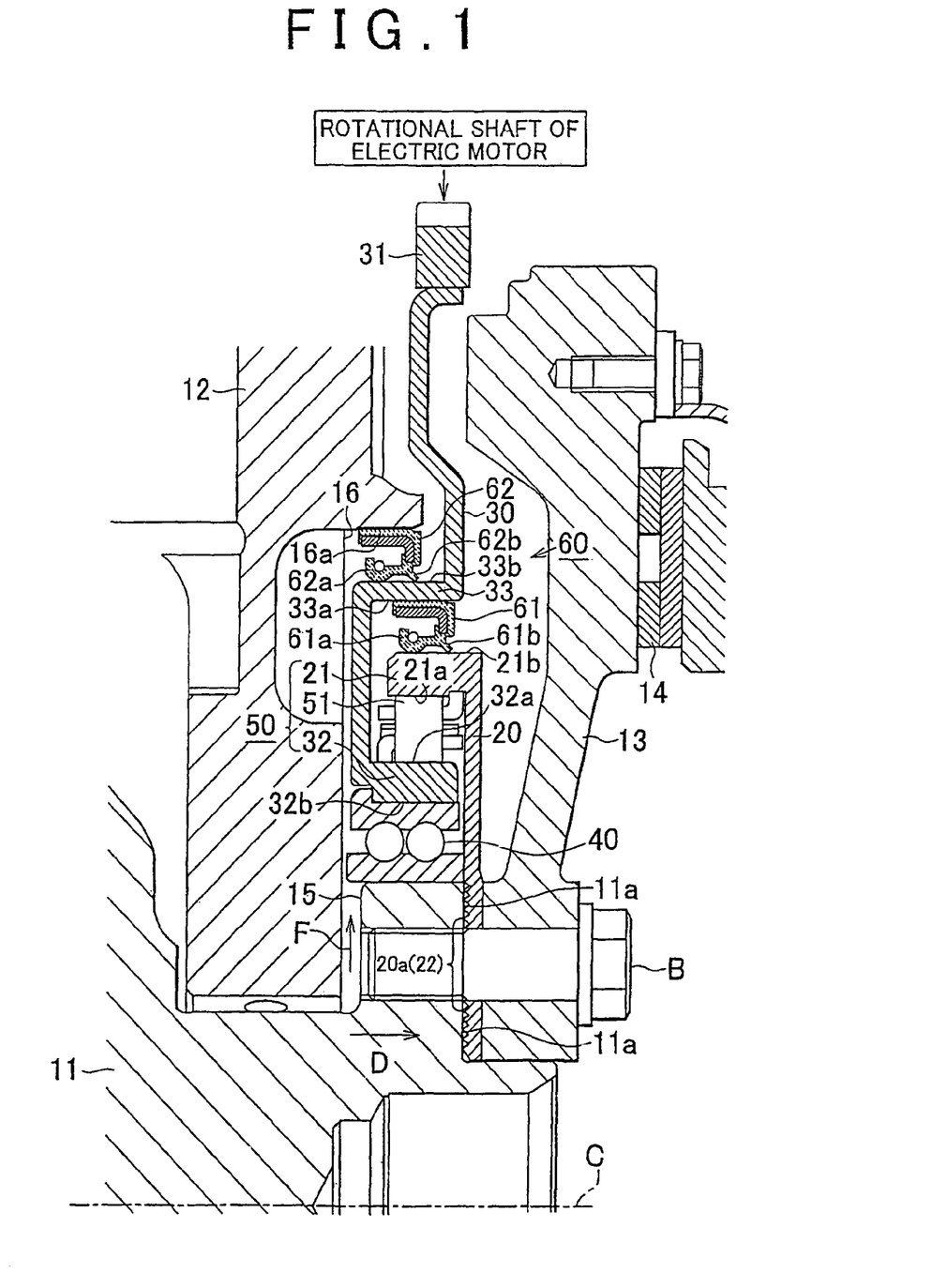
FIG. 1 shows a sectional structure of a power transmission and its surrounding area in a starter for an internal combustion engine according to one embodiment of the invention.

The following describes a starter for an internal combustion engine according to one embodiment of the invention. FIG. 1 shows a sectional structure of a power transmission mechanism and its surrounding area in the starter for an internal combustion engine according to the embodiment of the invention.

FIG. 1 only illustrates one side (upper side) of the power transmission mechanism with respect to the axis C of the crankshaft 11, which is output shaft of the internal combustion engine. In addition, FIG. 1 solely shows cross sections of components other than the crankshaft 11, a cylinder block 12, and a bolt B.

As shown in FIG. 1, the crankshaft 11 is rotatably supported between the cylinder block 12 and a ladder beam (not shown) in the internal combustion engine. A flywheel 13, an outer race plate 20, and a ring gear 30 are mounted on one end of the crankshaft 11.

The flywheel 13 is formed into an approximately disc shape having a circular opening at the center. A portion of the flywheel 13, which is mounted on the crankshaft 11, contacts the outer race plate 20. A clutch disk 14 is mounted on one side of the flywheel 13 that is opposite the side of the flywheel 13 that contacts the outer race plate 20. The clutch disk 14 is a part of a clutch mechanism that transmits the torque of the crankshaft 11 to a transmission. The clutch mechanism may be formed separately from the flywheel 13.

The outer race plate 20 is formed into an approximately disk shape. The outer race plate 20 has an outer peripheral race section 21. This outer race section 21 has a cylindrical shape and protrudes toward the cylinder block 12. The outer race plate 20 is formed with an opening at the center, as is the case with the flywheel 13.

The outer race plate 20 and the flywheel 13 are mounted in the stated order to the crankshaft 11 by inserting the end of the crankshaft 11 through the center openings of the outer race plate 20 and the flywheel 13. The outer race plate 20 and the flywheel 13 are fastened with bolts to the crankshaft 11 (more specifically, a flange 15), with the end of the crankshaft 11 inserted into the outer race plate 20 and the flywheel 13. The outer race plate 20 and the flywheel 13 thus rotate together with the crankshaft 11.

The ring gear 30 is formed into an approximately disc shape having a large circular opening at the center. The ring gear 30 has an outer peripheral gear section 31 with gear teeth extending around the entire periphery of the ring gear 30. The gear section 31 is coupled to and driven by a rotational shaft (not shown) of an electric motor that starts the engine. Accordingly, the ring gear 30 rotates as the electric motor is driven. The ring gear 30 has an inner peripheral race section 32. The inner race section 32 has a cylindrical shape and protrudes toward the outer race plate 20. The inner race section 32 includes an outer peripheral surface 32a that faces an inner peripheral surface 21a of the outer race section 21. In addition, the ring gear 30 has a step 33 on its midsection between the outer and inner peripheral portions. The inner peripheral portion is recessed relative to the outer peripheral portion toward the cylinder block 12, defining the step 33 having a cylindrical shape.

The ring gear 30 is mounted to the crankshaft 11 via a bearing 40. Specifically, the bearing 40 is provided between an outer peripheral surface of the flange 15 of the crankshaft 11 and an inner peripheral surface 32b of the inner race section 32.

Plural cages 51 are located between the outer peripheral surface 32a of the inner race section 32 of the ring gear 30 and the inner peripheral surface 21a of the outer race section 21 of the outer race plate 20. The cages 51, the outer race section 21 and the inner race section 32 form a one-way clutch 50.

The one-way clutch 50 is designed to permit torque transmission only in one direction between the outer race plate 20 and the ring gear 30, that is, the direction from the ring gear 30 to the outer race plate 20.

More specifically, before the internal combustion engine starts operating autonomously, the one-way clutch 50 is brought into engagement, under which condition the cages 51 mesh between the outer race section 21 of the outer race plate 20 and the inner race section 32 of the ring gear 30. This allows the outer race plate 20 and the ring gear 30 to be connected and rotate together. Simultaneously, the crankshaft 11 is rotated compulsory by the electric motor.

Eventually, the internal combustion engine operates autonomously. When the outer race plate 20 rotates with the crankshaft 11 at higher speeds than the ring gear 30 rotated by the electric motor, the one-way clutch 50 is released, under which condition the cages 51 are disengaged. This disconnects the outer race plate 20 from the ring gear 30. Mounted to the crankshaft 11 via the bearing 40, the ring gear 30 can rotate independently of the rotation of the crankshaft 11. Therefore, in this condition, the ring gear 30 rotates with the rotation of the output shaft of the electric motor, regardless of the crankshaft 11. This prevents the electric motor from being driven by torque of the crankshaft 11, thereby preventing excessive rotation of the electric motor. In addition, this allows the electric motor alone to stop operating with no influence on operation of the internal combustion engine.

In the starter according to the embodiment of the invention, the power transmission mechanism 60 includes the outer race plate 20, the ring gear 30, the bearing 40 and the one-way clutch 50. The power transmission mechanism 60 allows torque of the electric motor to be transmitted to the crankshaft 11, when the internal combustion engine starts.

According to the embodiment, as shown by the arrow F in FIG. 1, lubricant for the internal combustion engine is supplied from the engine body (the cylinder block 12 and an oil pan (not shown)) through an oil path within the crankshaft 11 or the cylinder block 12 to the interior of the power transmission mechanism 60. The lubricant is thus used for lubricating the respective parts of the power transmission mechanism 60, more particularly, the bearing 40 and the one-way clutch 50.

The power transmission mechanism 60 has sealing members 61 and 62 that prevent lubricant from leaking out of the interior of the power transmission mechanism 60. These sealing members 61 and 62 are both ring-shaped members.

The sealing member 61 is provided between the outer race section 21 of the one-way clutch 50 and the step 33 of the ring gear 30. More specifically, the sealing member 61 is fitted into the inner peripheral surface 33a of the step 33 and thus fixed to the ring gear 30. The sealing member 61 includes, on the inner peripheral side, a primary sealing lip 61a and a secondary sealing lip 61b. These respective lips slidably contact the outer peripheral surface 21b of the outer race section 21. The sealing member 61 seals the lubricant within a cavity defined between the outer race plate 20 and the ring gear 30.

In turn, the sealing member 62 is provided between the engine body and the step 33 of the ring gear 30. The engine body has arc-shaped recesses respectively formed on the cylinder block 12 and the oil pan. A combination of these recesses defines a circular recess (a sealing fit portion 16) in the plan view. The sealing fit portion 16 includes an inner peripheral surface 16a that opposes the outer peripheral surface 33b of the step 33. The sealing member 62 is fitted into the inner peripheral surface 16a of the sealing fit portion 16 and thus fixed to the engine body. The sealing member 62 includes, on the inner peripheral side, a primary sealing lip 62a and a secondary sealing lip 62b. These respective lips slidably contact the outer peripheral surface 33b of the step 33. The sealing member 62 seals the lubricant within a cavity defined between the ring gear 30 and the engine body.

In the starter according to the embodiment, the outer race plate 20 has a groove 22 on its contact surface 20a of a contact portion between the crankshaft 11 and the outer race plate 20. The groove 22 extends in the entire circumferential direction of the crankshaft 11. This maintains the coupling strength between the crankshaft 11 and the outer race plate 20 at a high level, while enhancing the sealing performance therebetween, and accordingly, the sealing performance of the power transmission mechanism 60.

Figure 2:
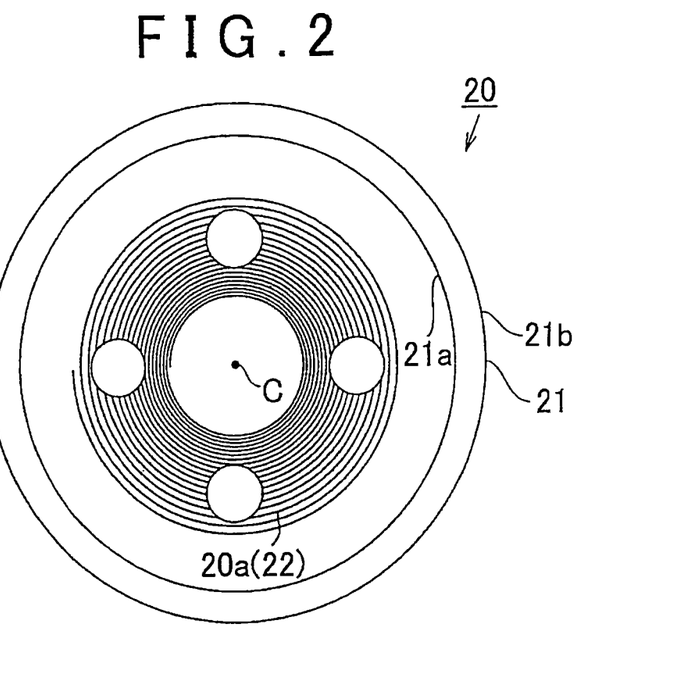
FIG. 2 is a top view showing a plane structure of an outer race plate, when viewed from the arrow D in FIG. 1.

A detailed description of the groove 22 is provided below. FIG. 2 shows the plane structure of the outer race plate 20, when viewed from the arrow D in FIG. 1. As shown in FIG. 2, the groove 22 extends about the axis C of the crankshaft 11 in a spiral pattern. More specifically, the groove 22 is a single groove extending in a fashion similar to a record groove. The groove 22 is formed across the entire contact surface 20a on the outer race plate 20 in the contact portion between the crankshaft 11 (FIG. 1) and the outer race plate 20.

According to the embodiment, the overall contact surface area between the crankshaft 11 and the outer race plate 20 is smaller relative to the case without the groove 22, and accordingly, the pressure applied to the contact surface is higher. This enhances the sealing performance of the contact portion between the crankshaft 11 and the outer race plate 20, and therefore, enhances the sealing performance of the power transmission mechanism 60.

Moreover, the outer race plate 20 is fastened to the crankshaft 11 with no sealing member interposed between these components. This structure helps maintain the coupling strength between the outer race plate 20 and the crankshaft 11 at a high level.

Figure 3:
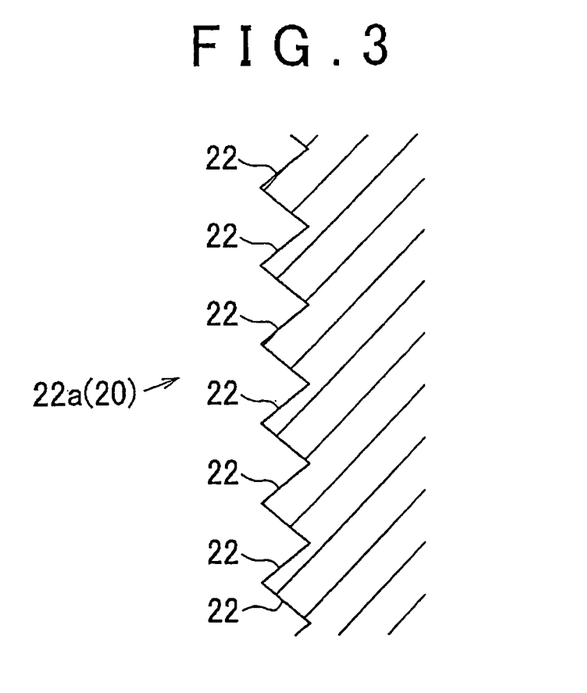
FIG. 3 shows a sectional profile of a contact surface of the outer race plate, taken along the direction perpendicular to the axis of the crankshaft.

As shown in FIG. 3, according to the embodiment, the groove 22 is formed such that the contact surface 20a of the outer race plate 20 has a sawtoothed shape in section, taken along the direction perpendicular to the axis C (see FIG. 1) of the crankshaft 11.

Figure 4A:
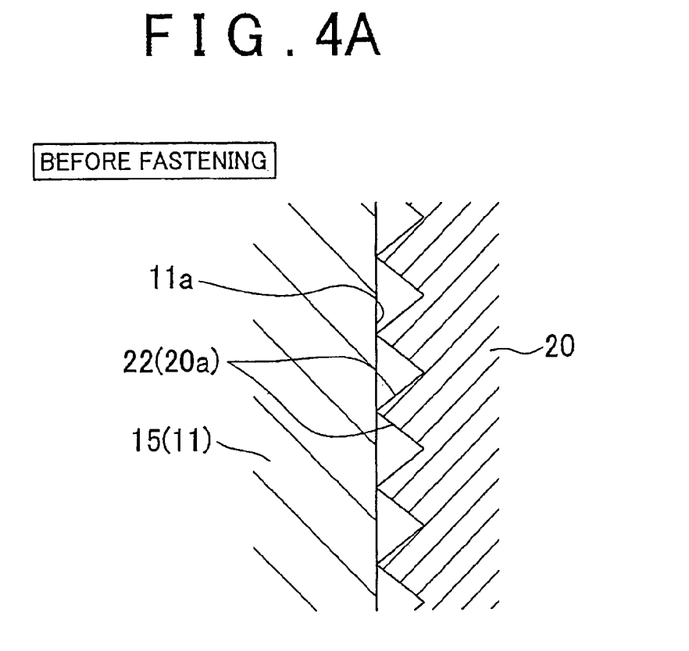
FIGS. 4A and 4B each show a sectional structure of a contact portion between the crankshaft and the outer race plate.

Therefore, as shown in FIG. 4A, before the outer race plate 20 is fastened to the crankshaft 11, protruding edges of the contact surface 20a of the outer race plate 20 come into line contact with the contact surface 11a of the crankshaft 11 (more specifically, the flange 15).

Figure 4B:
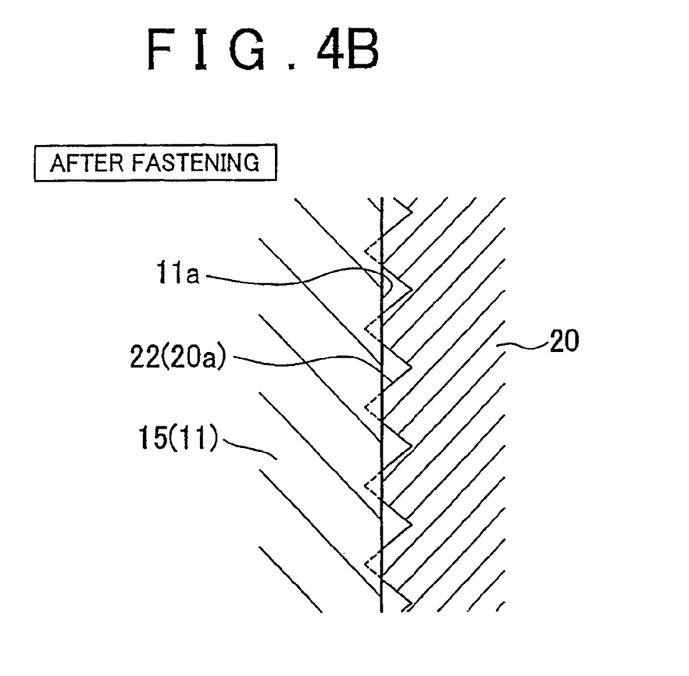

Under the condition of this line contact, fastening of the outer race plate 20 to the crankshaft 11 causes the protruding edges of the contact surface 20a (the portion shown by dotted lines) to be collapsed by the contact surface 11a of the crankshaft 11, resulting in plastic deformation as shown in FIG. 4B. Because the protruding edges of the contact surface 20a of the outer race plate 20 are deformed in conformity with the contact surface 11a of the crankshaft 11, this significantly increases a degree of tight contact between the contact surfaces 11a and 20a. Accordingly, the sealing performance of the contact portion between the crankshaft 11 and the outer race plate 20 improves significantly. It should be noted that FIG. 4B illustrates the amount of deformation of the protruding edges of the contact surface 20a in an exaggerated manner for the purpose of easy understanding.

If a groove is formed only on a part of the contact surface 20a of the outer race plate 20, then a plane contact exists between the remaining part of the contact surface 20a where no groove is formed, and the corresponding part of the contact surface of the crankshaft 11, before the outer race plate 20 is fastened to the crankshaft 11. Therefore, should such a construction be employed, the outer race plate 20 needs to be fastened to the crankshaft 11 with greater force to apply a higher pressure to the contact surface 20, in order to achieve plastic deformation of the protruding edges of the contact surface 20a of the outer race plate 20.

In contrast, according to the embodiment of the invention, the groove 22 is formed across the entire contact surface 20a of the outer race plate 20. Thus, before the outer race plate 20 is fastened to the crankshaft 11, almost no plane contact exists between the contact surface 11a of the crankshaft 11 and the contact surface 20a of the outer race plate 20.

Therefore, compared to the construction, in which a groove is formed only on a part of the contact surface 20a, less force is required to fasten the outer race plate 20 to the crankshaft 11. Even if the resultant pressure applied to the contact surface 20a is lower, the protruding edges of the contact surface 20a are still subjected to plastic deformation. Thus, the degree of tight contact between the contact surfaces 11a and 20a increases to a desired level.

As described above, the following effects are obtained according to the embodiment. (1) The outer race plate 20 has a groove 22 on its contact surface 20a of a contact portion between the crankshaft 11 and the outer race plate 20. The groove 22 extends in the entire circumferential direction of the crankshaft 11. This maintains the coupling strength between the crankshaft 11 and the outer race plate 20 at a high level, while enhancing the sealing performance therebetween, and accordingly, the sealing performance of the power transmission mechanism 60.

(2) The groove 22 is formed in a single groove extending in a fashion similar to a record groove, that is, extending about the axis C of the crankshaft 11 in a spiral pattern. Thus, the groove 22 is formed simply in a single cutting process.

(3) The groove 22 extends such that the contact surface 20a of the outer race plate 20 has a sawtoothed shape in section, taken along the direction perpendicular to the crankshaft 11. Hence, when the outer race plate 20 is fastened to the crankshaft 11, the protruding edges of the contact surface 20a are subjected to plastic deformation, thereby increasing the degree of tight contact between the contact surface 20a and the contact surface 11a of the crankshaft 11. Thus, the sealing performance improves at the contact portion between the crankshaft 11 and the outer race plate 20. Accordingly, the sealing performance of the power transmission mechanism 60 improves to a desired level.

(4) The groove 22 is formed across the entire contact surface 20a of the outer race plate 20. Thereby, compared to the construction, in which a groove is formed on a part of the contact surface 20a, a relatively lower surface pressure suffices to achieve plastic deformation of the protruding edges of the contact surface 20a. This increases the degree of tight contact between the contact surface 20a and the contact surface 11a of the crankshaft 11 to a desired level.

It should be noted that the aforementioned embodiment may be modified as follows. The groove 22 is not necessarily formed across the entire contact surface 20a of the outer race plate 20. The groove 22 may be formed on only a part of the contact surface 20a such that, for example, no groove 22 is provided on the outer or inner periphery of the contact surface 20a.

Figure 5:
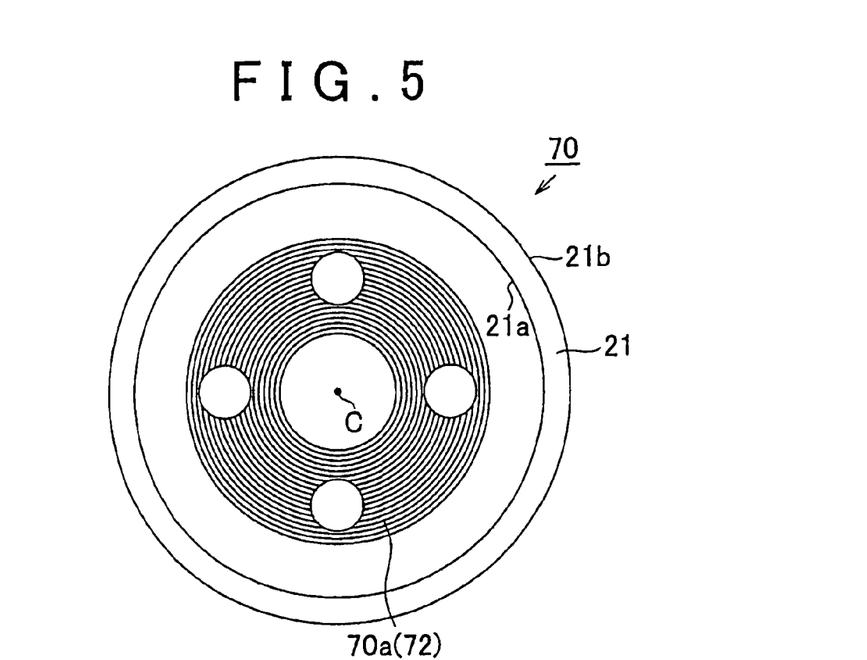
FIG. 5 is a top view showing a plane structure of an outer race plate according to another embodiment of the invention.

The groove may extend in any fashion other than the record groove, as long as the groove extends about the axis C of the crankshaft 11 in a spiral pattern. As shown in FIG. 5, in place of the groove extending in a spiral pattern, plural grooves 72 may be formed on a contact surface 70a of an outer race plate 70, such that each groove extends about the axis C of the crankshaft 11 in a circular fashion. In such a construction, the plural grooves 72 may be coaxial grooves. This allows the grooves to be easily formed by the cutting process.

The grooves may extend such that the contact surface of the outer race plate has any shape in section other than the sawtoothed shape, taken along the direction perpendicular to the crankshaft 11. For example, the adjacent grooves may be located with a larger space therebetween.

A circular groove may only be formed on the contact surface of the outer race plate. The contact surface of the outer race plate may have a maze-like groove that extends in the entire circumferential direction of the crankshaft 11.

Figure 6:
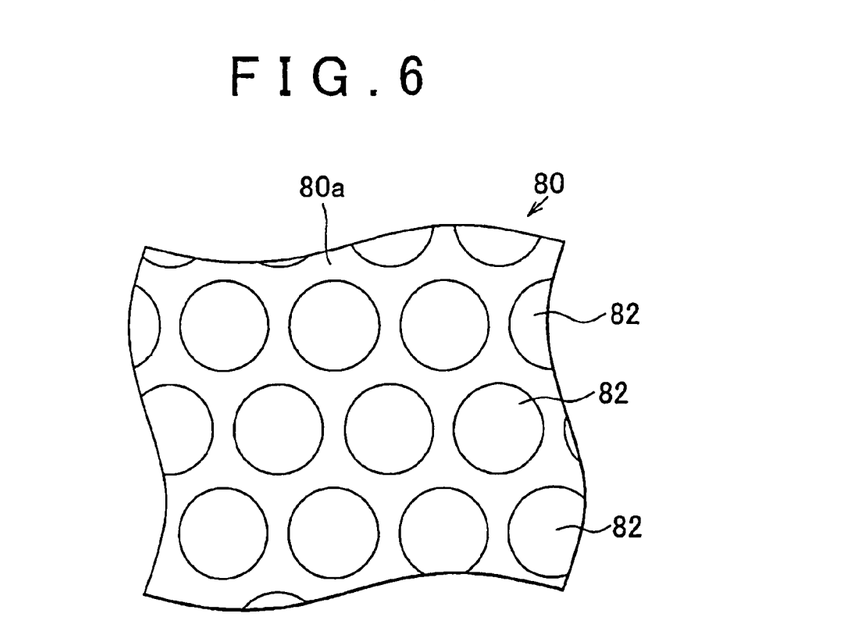
FIG. 6 is a partly enlarged top view showing the plane structure of an outer race plate according to still another embodiment of the invention.
Figure 7:
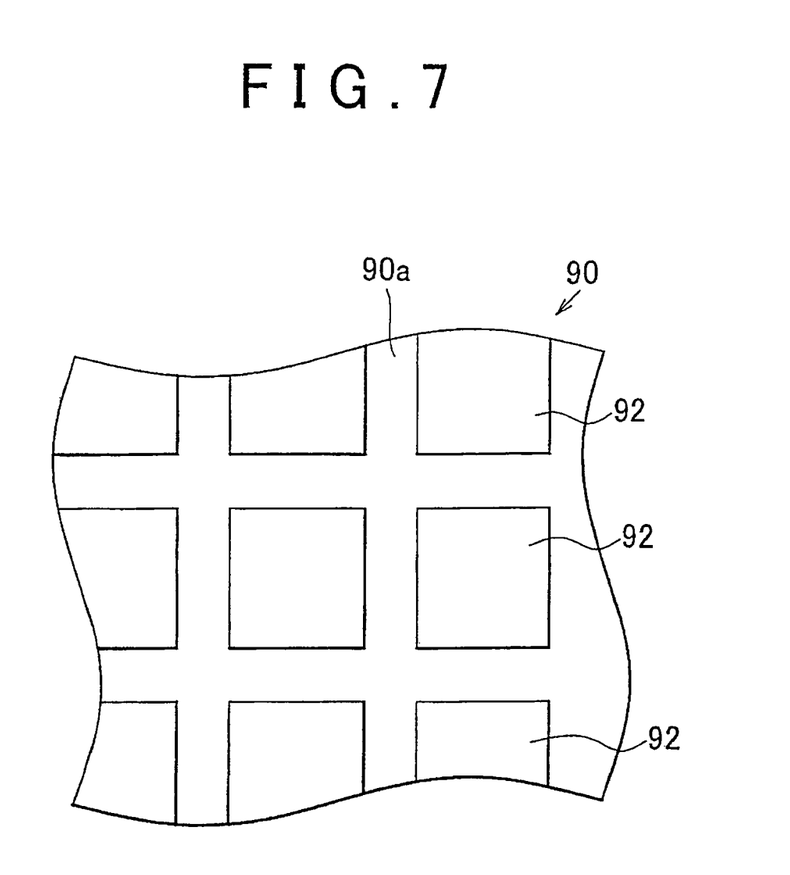
FIG. 7 is a partly enlarged top view showing the plane structure of an outer race plate according to still another embodiment of the invention.

Instead of the groove formed on the contact surface of the outer race plate, several recessed portions may be provided in the entire circumferential direction of the crankshaft 11. Such recessed portions may be each formed into a circular or polygonal shape and located with a predetermined space between the adjacent recesses, such that these recessed portions may form any geometric pattern on the contact surface. FIGS. 6 and 7 show example patterns of such recesses formed on the respective outer race plates. As shown in FIG. 6, an outer race plate 80 has circular recesses 82 on its contact surface 80a with a predetermined space therebetween, such that these recesses form a so-called polka-dot pattern. As shown in FIG. 7, an outer race plate 90 has square recesses 92 on its contact surface 90a with a predetermined space therebetween, such that these recesses form a so-called lattice pattern.

As mentioned above, a recess is formed on the contact surface of the outer race plate in the contact portion between the crankshaft 11 and the outer race plate. Alternatively, a recess may be formed on the contact surface 11a of the crankshaft 11. Furthermore, respective recesses may be formed on both the contact surfaces.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A starter for an internal combustion engine comprising:
a power transmission mechanism that includes:
an engine-side power transmission member fastened to an engine output shaft, the engine-side power transmission member includes a flywheel and an outer race plate that is separate from the flywheel;
an electric-motor-side power transmission member provided rotatably relative to the engine output shaft and coupled to a rotational shaft of an electric motor for starting the engine;
a one-way clutch provided between the engine-side power transmission member and the electric-motor-side power transmission member to permit torque transmission in a direction from the electric-motor-side power transmission member to the engine-side power transmission member; and a sealing member respectively provided between the engine-side power transmission member and the electric-motor-side power transmission member, and between an engine body and the electric-motor-side power transmission member, wherein the starter for an internal combustion engine uses lubricant supplied from the engine body to the interior of the power transmission mechanism to lubricate the power transmission mechanism, a partially recessed portion that includes a first protruding portion that seals between the engine output shaft and the engine-side power transmission member is formed in the entire circumferential direction of the engine output shaft on at least one of a contact surface of the engine output shaft and a contact surface of the outer race plate facing the surface of the engine output shaft of the engine-side power transmission member in a contact portion between the engine output shaft and the outer race plate of the engine-side power transmission member, and the contact surface of the engine output shaft that contacts a surface of the outer race plate faces in the axial direction, and the engine output shaft includes a second protruding portion that extends in an axial direction of the engine output shaft to be located inside an inner circumferential surface of the outer race plate in a radial direction of the outer race plate.

2. The starter for an internal combustion engine according claim 1, wherein the partially recessed portion is formed into a groove that extends about an axis of the engine output shaft in a spiral pattern.

3. The starter for an internal combustion engine according to claim 2, wherein the partially recessed portion is a single groove that extends in a fashion similar to a record groove.

4. The starter for an internal combustion engine according to claim 2, wherein the groove, which is provided on at least one of the contact surfaces of the engine output shaft and the engine-side power transmission member in the contact portion between the engine output shaft and the engine-side power transmission member, extends such that the contact surface has a sawtoothed shape in section taken along a direction perpendicular to the engine output shaft.

5. The starter for an internal combustion engine according to claim 4, wherein the groove is formed across at least one of the entire contact surfaces.

6. The starter for an internal combustion engine according to claim 1, wherein the partially recessed portion is formed into plural grooves that extends about the axis of the engine output shaft in a circular fashion.

7. The starter for an internal combustion engine according to claim 6, wherein the plural grooves are coaxial grooves.

8. The starter for an internal combustion engine according to claim 6, wherein the groove, which is provided on at least one of the contact surfaces of the engine output shaft and the engine-side power transmission member in the contact portion between the engine output shaft and the engine-side power transmission member, extends such that the at least one contact surface has a sawtoothed shape in section taken along a direction perpendicular to the engine output shaft.

9. The starter for an internal combustion engine according to claim 8, wherein the groove is formed across at least one of the entire contact surfaces.

10. The starter for an internal combustion engine according to claim 1, wherein the partially recessed portion that includes the first protruding portion is formed directly on at least one of the contact surfaces of the engine output shaft and the engine-side power transmission member.

11. The starter for an internal combustion engine according to claim 10, wherein the partially recessed portion includes a plurality of recessed portions and the first protruding portion of the partially recessed portion includes a plurality of protruding portions.

12. The starter for an internal combustion engine according to claim 11, wherein the plurality of recessed portions are formed into circular or polygonal shapes.

13. The starter for an internal combustion engine according to claim 1, wherein the engine-side power transmission member is fastened to the engine output shaft such that edges of the first protruding portion of the partially recessed portion of the at least one contact surface are subject to plastic deformation, thereby increasing a degree of tight contact between respective contact surfaces in a contact portion between the engine output shaft and the engine-side power transmission member.

\* \* \* \* \*